United States Patent [19]

Peters et al.

[11] 4,097,154
[45] Jun. 27, 1978

[54] PRECISE POINTING ALIGNMENT OF OPTICAL PROBES

[75] Inventors: David L. Peters, Whitney Point; Philip R. Marr, Sr., Vestal, both of N.Y.

[73] Assignee: The Singer Company, Binghamton, N.Y.

[21] Appl. No.: 725,165

[22] Filed: Sep. 21, 1976

[51] Int. Cl.² .................. G01B 11/26; G09B 9/08
[52] U.S. Cl. .................. 356/152; 35/12 N; 250/203 R; 250/578; 358/104
[58] Field of Search .......... 35/12 N, 12 C, 12 K, 35/11 A; 352/53, 131, 132; 356/152; 358/104, 125; 250/203 R, 578

[56] References Cited

U.S. PATENT DOCUMENTS

| | | | |
|---|---|---|---|
| 3,479,454 | 11/1969 | Wolff | 358/104 |
| 3,612,761 | 10/1971 | Wolff | 358/104 |
| 3,746,454 | 7/1973 | Pace et al. | 250/578 |
| 3,787,619 | 1/1974 | Wolff | 358/104 |
| 3,794,761 | 2/1974 | Genchi et al. | 358/125 |
| 3,865,491 | 2/1975 | Hogan | 356/152 |
| 3,903,615 | 9/1975 | Dotsko | 35/12 N |
| 3,914,540 | 10/1975 | Slater | 352/53 |
| 3,923,273 | 12/1975 | Alpers | 358/125 |
| 4,019,060 | 4/1977 | Woodman | 250/203 R |

Primary Examiner—S. C. Buczinski
Attorney, Agent, or Firm—James F. Duffy; Jeffrey Rothenberg

[57] ABSTRACT

Two camera models are each viewed by an optical probe such that each optical probe views its respective model with the same perspective. To this end both probes are pointed towards a desired point on their respective model boards. A light beam, characterized by a particular light signature, is emitted from the desired point on each board and passed to a detector by the probe associated with that board. Detection is on an array of photosensitive elements arranged such that the X-Y coordinates of the point of impingement of the beam on the array may be determined. The location of each light beam on each detector array is correlated. The pointing of the probes is then adjusted such that when each light beam falls on the same X-Y location on the respective photosensitive element arrays, the optical probes are pointing in the same relative direction and viewing both scale models with the same perspective.

17 Claims, 2 Drawing Figures

PRECISE POINTING ALIGNMENT OF OPTICAL PROBES

BACKGROUND

1. Field of the Invention

The invention relates to camera models and camera probes used in simulation devices. More particularly, it relates to the use of two distinct camera models, each with separate camera probes, and to the problem of aligning the camera probes, one with respect to the other, so that the scene being imaged by one of the probes may be continually inset within the scene imaged by the other probe in such a manner that no visual "glitches" are presented to a trainee so as to distract him or impair the sense of reality created within the simulator environment.

2. Description of the Prior Art

In simulator training devices, much use is made of scale models. A gantry-mounted optical probe is maneuvered about the scale model in accordance with the manner in which a trainee manipulates the controls of the simulator trainer device. A typical scale model will include an airport and the territory surrounding it. For greatest-training purposes, an existing airport and the terrain peculiar to that airport are carefully reproduced on the scale model board. In this manner a trainee learning to fly an aircraft becomes familiar with the airfield approaches at the same time as he learns to handle the controls of the particular aircraft simulated.

In certain instances where training, taxiing, and maneuvering among other aircraft parked at the airport may be required, significant detailing of the airport, its buildings, and the various parked aircraft is required. In such instances two model boards are usually provided: One at a scale which will allow the trainee to view the airport and its surrounding terrain and the other model, built to a larger scale, showing the airport itself in greater detail. Two model boards are used since it would be impractical, in terms of expense and space requirements, to produce a single model board in sufficient detail and of large enough scale to detail the airport area and include enough of the surrounding terrain to give sufficient training in flying above that terrain.

A similar situation will arise in the case in which the trainer simulates a spacecraft. If one considers the scene viewed by the astronaut-pilot of an incoming spacecraft, it will be realized that a large sector of the surface of the earth will be in view as the astronaut maneuvers his craft to reduce the energy of his fall. The closer the astronaut comes to earth, the smaller is the sector of earth that he views. Eventually his landing site will become discernible and he will target-in on that area and make his landing approach and touch-down at the designated site.

In terms of camera models, it will be obvious that the model depicting the view from space, that large sector of earth viewed by the astronaut, will require relatively little detail. However, the landing site itself must provide significantly greater detail to guide the astronaut pilot to a safe landing as he approaches closer to the ground. Thus, a second model board of the designated landing site built to a significantly greater scale than that of the vast sector of earth depicted in the first model board, is required in order to guide and train the astronaut-pilot in his landing maneuver.

Although the two situations set forth above are similar in that they each require at least two model boards to be utilized with the simulator trainer, the problems presented, in effectively implementing such training, are quite different. For example, a typical ploy for shifting a pilot's presentation from the small scale, low detail model of the airport and its environs is to allow the trainee to begin a normal approach to the airport. However, it may be conveniently arranged that a simulated cloud bank must be traversed as he comes closer to the airport. As the trainee apparently enters into the cloud bank, the camera probe, which is not then presenting scale model information to the trainee, is moved over and above the large scale, high detail model of the airport itself. Thus, as the pilot breaks from the clouds he finds himself still on his approach path and in clear sight of the airport, which he sees in great detail.

When an astronaut is piloting his craft on its return flight to earth the designated landing site begins to assume significant detail while the aircraft is still at such an altitude that the surrounding terrain forms a significant part of the pilot's field of view. This requires the continual insetting of details from the large scale, landing-site model rather than merely making single transition from one scale model to the next. As the spacecraft continues its descent, the landing site assumes a greater proportion of the image presented to the astronaut-pilot, the environs assuming less importance as the pilot concentrates on his landing site. Eventually an altitude is reached at which only the designated landing site fills the pilot's field of view. At this time no further insetting is required and only the greatly detailed, high scale model of the landing site is required.

Since there is a continual process of insetting the image of the highly detailed landing site within the image of the high altitude, low detail model, it is impractical to consider the use of a conveniently simulated cloud layer to disguise the imagery transition. Such trickery would become readily apparent to the trainee-operator of the simulator. The problem, therefore, is to enable the continual insertion of a detailed image of the landing site into the display presented to the astronaut-trainee in such a manner that no visual "glitches" are presented to the astronaut so as to distract him or impair the sense of reality sought to be created within the simulator environment.

Television viewers have been aware of insetting techniques for some time. This occurs when a picture appears in one corner of the TV presentation while the main scene continues to be played on the balance of the screen. However, there are other instances in which commercial television stations make use of insetting techniques and the viewer is unaware that part of the picture he is viewing is produced by an inset. Often this latter technique is employed when the entertainer being viewed on TV appears to enter into a model stage set much smaller than the entertainer himself. Frequent use of this technique is made in advertising in which the product advertised appears larger-than-life and dwarfs the individual on the screen who is advocating the use of the product being advertised.

In a simulator environment there may be no sharp line of demarcation between the background scene and the landing site image to be inset therein, such as occurs in the examples of commercial television techniques just noted. The image inset in the simulator display must appear to blend evenly and be a part of the entire scene. The point of view from which the overall scene is observed must agree with that in which the inset image is viewed. For most effective training, the operator must be completely unaware of the utilization of any insetting whatsoever.

If there are two optical probes each viewing a different scale model there will be a decided change in perspective the first time the image of one probe is inset within the scene being viewed by the other probe unless great caution is exercised to assure that both probes are pointing precisely in the same direction. In addition to this initial "glitch" brought about by pointing inaccuracy, there would be additional degradation at the edges of the inset image. The edges of the inset would tend to waver. The wavering boundary would be brought about by the pointing error and the fact that the aircraft is maneuvering, thereby continually bringing any pointing misalignment of the probes into play. The wavering effect is further aggravated by the fact that typical good practice requires a fade-in of the inset image so that detail within the inset is increased in a gradual manner. If the probes are not precisely pointed, the fade-in will produce a double image effect. Precise pointing of the optical probes is therefore a primary criterion for successful insetting.

It shall therefore be an object of the present invention to supplement the positional control circuits of the optical probes employed with scale model/camera probe techniques in a simulator environment. The purpose of such supplementation shall be to reduce any pointing error that might nominally exist between two or more optical probes when it is desired that both of said probes shall track each other.

SUMMARY OF THE INVENTION

In a camera model display system comprising two or more optical probes and an equal number of scale models such that one of said scale models is built to a small scale factor, contains relatively few details, and depicts a relatively large area while another of said scale models is built to a large scale factor, contains a significantly greater amount of detail, and depicts only a small area of the scene shown in the first scale model, it shall be required that both optical probes view the common area with the same perspective. To this end, both probes are pointed towards a desired point on their respective model boards. A light beam characterized by a particular light signature, for example an infrared laser beam, is emitted from the desired point on each board. The light beam from a particular model board is detected by the probe associated with the board. Detection is on an array of photo elements arranged such that the x-y coordinates of the point of impingement of the beam on the array may be determined. The location of each light beam on each detector array is correlated. If both beams do not fall at the same x-y location on the photosensitive element array, the probe viewing the large scale, high detail model is adjusted to bring its detected beam to the same x-y location on its detector array as is that of the probe viewing the model board having the smaller scale factor and relatively lesser detail. When each beam falls at the same x-y location on the respective photosensitive element arrays, the optical probes are pointing in the same relative directions and viewing both scale models with the same perspective.

Because the information gleaned in correlating the location of the detected beams on their respective photosensitive array supplements the conventional-but-precise motion control system of each probe, the end result is an enhanced precision of the overall system.

DESCRIPTION OF THE INVENTION

Figure 1:
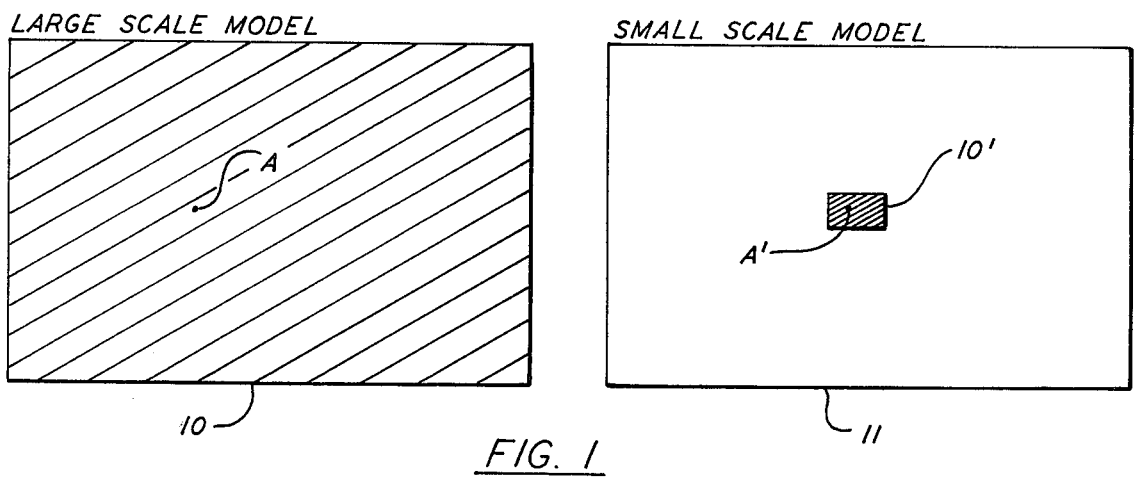
FIG. 1 illustrates two model boards one of which is a large scale model of a small segment of the other.

FIG. 1 represents two camera model boards which may be of the same physical dimension. Model 10, however, represents a large scale model of a portion of model board 11. For example, Model Board 10 may represent the area designated 10' on the surface of model board 11. Similarly the point A on model board 10 represents the same point A' within the sector 10' on model board 11.

Figure 2:
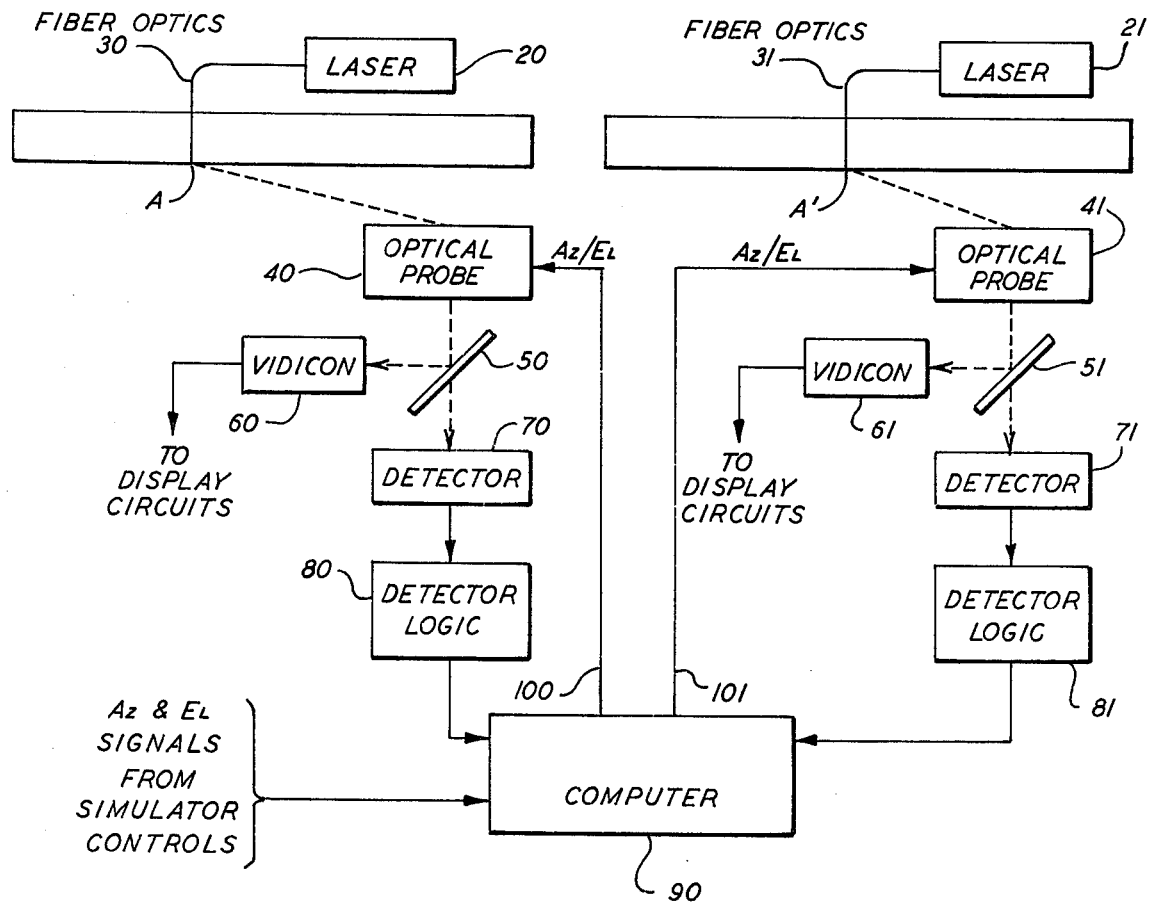
FIG. 2 is a block diagram, representative of the invention, for achieving precise pointing of two optical probes.

An edge view of model boards 10 and 11 is depicted in FIG. 2 along with the necessary devices to make the invention functional. Laser 20 and fiber optic bundle 30 combine to emit a cone of light energy from point A on model board 10. An identical laser 21 and fiberglass optics bundle 31 combine with model board 11 to emit a cone of light energy from point A'. Lasers 20 and 21 are selected for their particular signature characteristic. For example, the lasers may be selected to emit infrared energy at approximately 682 nanometers wavelength.

Points A and A' may be taken to be the touch-down point on a runway duplicated on differing scales on model boards 10 and 11, respectively. In actual practice the area 10' on model board 11 may be a reduced, photographic reproduction of model board 10 in its entirety. For purposes of exposition, it will be assumed that model boards 10 and 11 are used in conjunction with a space shuttle mission flight simulator. It will be further assumed that model board 11 contains the surface terrain seen by the astronaut trainee as he returns to earth following a mission in space. Model board 11 will provide sufficient detail to guide the astronaut in his landing approach down to levels of approximately 15,000 feet. At approximately 15,000 feet, greater detail will be required in area 10', the location of the landing site. To this end, details from large-scale model board 10 will be inserted in the visual display presented to the astronaut trainee.

As the astronaut trainee continues his descent the detail presented to him from model board 10 will assume a greater and greater proportion of the display presentation. Eventually, an altitude will be reached at which the terrain depicted on model board 10 fills completely the field of view display being seen by the astronaut trainee. At this time no further information from model board 11 will be presented to the astronaut.

At all times during his descent, it will be assumed that the astronaut is maneuvering his shuttle craft to touch down at point A' on model board 11 or its coincident point A on model board 10.

Each of model boards 10 and 11 are conventionally illuminated by a lighting array, not shown. Optical probe 40 is maneuvered above model board 10 in accordance with the manner in which the astronaut manipulates the controls of the simulator. Probe 40 transmits both the reflected illumination lighting received by it from model board 10 as well as the laser light emitted at point A. The light transmitted through probe 40 is caused to impinge on dichroic-type filter 50. Filter 50 reflects the illumination lighting transmitted through probe 40 and directs the illumination lighting to vidicon 60 from which it is output to the electronic display circuitry. Filter 50 transmits the laser light in the output of probe 40 so that detector 70 "sees" only that laser light output.

Detector 70 actually comprises an array of elements highly photosensitive to the infrared light in the laser spectrum. Detector 70 may be an area array of either charge coupled devices (CCD) or of charge injection devices (CID). Reference is here made to the following technical articles for background information on both CID and CCD technology: *Solid State Imaging Systems,* Sachs & Howard, Electro-Optical Systems Design, Oct. 1975, pages 34–38; *Enormous Bucket-Brigade Scanner Achieves High Efficiency,* B. J. Deliduka, Computer Design, Feb. 1976, pages 89–96.

Because detector 70 is an area array of photosensitive elements, it will be able to provide digital position data with respect to the horizontal and vertical position (X and Y) of the point on the detector array at which the laser beam impinges. Detector logic 80 determines the point of impingement of the laser beam on detector 70 and inputs the X-Y coordinate information to computer 90.

In a similar manner, optical probe 41 collects the reflected illumination lighting from model board 11 as well as the light from laser 21 radiating from point A'. The output of optical probe 41 is filtered by dichroic-type filter 51 such that the reflected illumination lighting is directed to the vidicon 61 while the infrared laser light is directed to detector 71. Detector logic 81 determines the X-Y coordinate of the point of impingement of the laser beam upon detector 71 and inputs this information also to computer 90.

What has been presented thus far is a camera-model display system for use with a simulated training device. The display system comprises two model boards, one of which depicts a relatively small area of the other and presents this small area in great detail. Each of the model boards is provided with an optical probe which moves above its respective model board in accordance with the maneuvers dictated by the trainee's operation of the simulator's controls. It is a requirement of the system that this display which is presented to the trainee operator of the simulator shall, through he use of insetting techniques, contain display information from both model boards and their associated optical probes. Insetting of the scene seen by one probe into that viewed by the other probe must be accomplished without perturbation. As noted earlier pointing inaccuracies between the two optical probes can lead to an initial shift in the perspective of the inset image followed by a wavering of the presentation and the possibility of double-imaging, as fade-in techniques are employed during image transitions.

It may be assumed that using conventional means to control the pointing of each optical probe will allow the probes to be pointed with a precision of at least 2°. It will be the task of the invention to improve this pointing accuracy because even such relatively small disagreements in pointing will produce a visible distortion of the final display.

As FIG. 2 indicates, computer 90 receives azimuth and elevation input commands from the simulator controls. This information is fed through lines 100 and 101 to control the positioning of optical probes 40 and 41, respectively. As already noted, detector logic 80 outputs to computer 90 the X-Y coordinate of the point on detector array 70 at which the laser light from point A impinges. Similarly, detector 81 outputs to computer 90 the X-Y coordinates of the point on detector 71 at which the laser light from point A' impinges. Within computer 90 these X-Y coordinates are compared and any difference between them results in a differential control signal being applied by computer 90 to control line 100 to modify the position of optical probe 40.

Optical probe 40 is thereby effectively slaved to optical probe 41. Optical probe 41 is chosen as the master probe since the perspective viewed by probe 41 is presented to the trainee long before the need to inset data from probe 40 since the above exposition considers a descent and landing operation. It is readily conceivable that probe 40 would be the master and probe 41 the slave in a take-off and ascent maneuver.

It should be noted that, since probes 40 and 41 may be pointed with reasonable accuracies of 2° or less using conventional techniques, the field of view required for coverage of detectors 70 and 71 is significantly less than the field of view required for the vidicon cameras 60 and 61. Thus, the array of photosensitive elements required for detectors 70 and 71 may be of reasonable size, requiring only a field of view coverage of approximately ten degrees, although optical probes 40 and 41 may present a field of view of sixty degrees or better to vidicons 60 and 61.

What has been disclosed is the apparatus and technique to enhance conventional control mechanisms of an optical probe for use in a camera-model system. The practice of the invention allows pointing of optical probes with a precision of 15 arc minutes in a system displaying a potential error of 1.5° (figures indicated are root sum square system errors).

A logical extrapolation of the principles set forth herein will permit the precise targeting of an optical system. This is the essence of what is done with the slaved optical probe 40 in the embodiment disclosed.

If the target were to carry a light of known characteristic, a dichroic type filter such as filter 50 could be utilized as disclosed. The location of the characteristic light on a detector array such as detector 70 could then be determined and the optical system driven so as to precisely boresight the target.

If the target were not equipped with light of known characteristics, a beam splitter could be utilized in place of a dichroic type filter. Part of the light from the target would thus be directed to the viewer while another part would be imaged on the detector array. By integration of the area imaged on the detector, the optical system could be driven to bear directly on the target, using the teachings already disclosed.

A preferred embodiment of the invention has been described. It should be obvious to those skilled in the art that various changes and modifications may be made therein without departing from the invention. It is, therefore, intended to cover herein all such changes and modifications as fall within the true spirit and scope of the invention.

What we claim is:

1. In a camera/model display system comprising two model boards, each with its own optical probe and with means to control the positioning of said optical probes, apparatus to enhance the positioning of said probes to allow each to precisely view desired points on their respective model boards with the same perspective comprising:

a. a laser having a characteristic light signature distinguishable from that of the lighting used to illuminate said model boards;
b. means to communicate said laser light to a desired point on each model board from which point said light is emitted;
c. means to distinguish said laser light from the light output of each optical probe as said probes view their respective model boards;
d. means to locate the relative positions of said laser light within the field of view of each of said optical probes; and
e. means to correlate said locations and to generate a differential control signal to apply to at least one of said optical probes, said differential control signal enhancing the operation of said means of controlling the position of said probes and being operative only when there is a difference in the relative positions of said laser light within the field of view of each of said optical probes.

2. The invention of claim 1 in which said laser emits light in the infrared region of the spectrum.

3. The invention of claim 1 in which said means of communicating laser light to said model boards is comprised of fiber optics.

4. The invention of claim 1 in which said means to distinguish said laser light from the output of each optical probe comprises a dichroic type filter.

5. The invention of claim 1 in which said means to locate the relative positions of said laser light within the field of view of each optical probe comprises:
a. an array of photosensitive elements on which the laser light is detected at its point of impingement; and
b. logic means to determine and designate the location of said point of impingement of laser light on said array.

6. The invention of claim 5 in which said array of photosensitive elements is an area array and said location of the point of impingement of said laser light is designated in X-Y coordinates related to said area array.

7. The invention of claim 5 in which said array of photosensitive elements comprise a charge coupled device (CCD).

8. The invention of claim 5 in which said array of photosensitive elements comprise a charge injection device (CID).

9. The invention of claim 1 in which said means to control the positioning of said optical probes comprises computer controlled electronics and associated drive mechanisms and said computer is also utilized to correlate the locations of laser light in the field of view of each optical probe and to generate said differential control signal to drive at least one probe so as to bring the location of the laser beams within each field of view into agreement.

10. In a camera/model display system comprising two model boards, each with its own optical probe and with means to control the positioning of said optical probes, a method to enhance the positioning of said probes to allow each to precisely view desired points on their respective model boards with the same perspective comprising the steps of:
a. providing a laser having a characteristic light signature distinguishable from that of the lighting used to illuminate said model boards;
b. communicating said laser light to a desired point on each model board from which point said light is emitted;
c. distinguishing said laser light from the light output of each optical probe as said probes view their respective model boards;
d. locating the relative position of said laser light within the field of view of each of said optical probes; and
e. correlating said locations and generating a differential control signal to apply at least one of said optical probes, said differential control signal enhancing the operation of said means of controlling the position of said probes and being operative only when there is a difference in the relative positions of said laser light within the field of view of each of said optical probes.

11. The method of claim 10 in which said laser light is communicated to said model boards by transmitting said light through fiber optics.

12. The method of claim 10 in which said laser light is distinguished by passing the output of said optical probes through a dichroic type filter.

13. The method of claim 10 in which the location of the relative position of the laser light within the field of view of each optical probe comprises the further steps of detecting and designating the point of impingement of said laser light on an array of photosensitive elements.

14. The method of claim 13 comprising the further steps of providing an area array of photosensitive elements and designating the detected point of impingement of said laser light in terms of the X-Y coordinates of said array.

15. The method of claim 13 detecting said laser light with a charge coupled device (CCD).

16. The method of claim 13 detecting said laser light with a charge injection device (CID).

17. The method of claim 10 using said means to control the position of said optical probes to also correlate the position of said laser light within the field of view of each optical probe and to generate said differential control signal driving at least one probe so as to bring the location of the laser beams within each field of view into agreement.

* * * * *